(No Model.)
G. LINDENTHAL.
CABLE FOR SUSPENSION BRIDGES.
No. 378,696.　　　　　　　　　Patented Feb. 28, 1888.
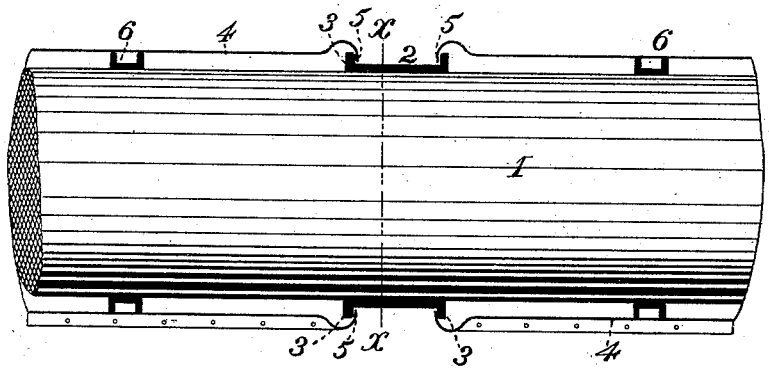
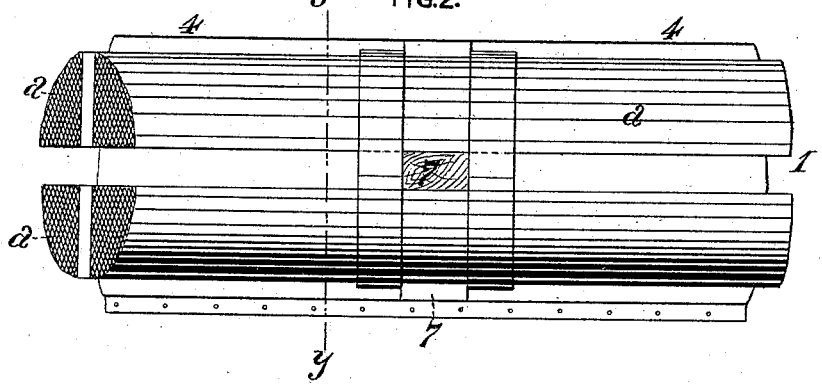
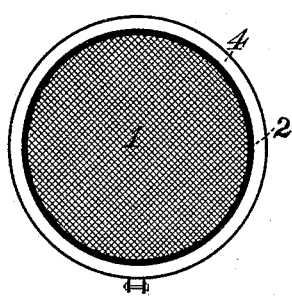
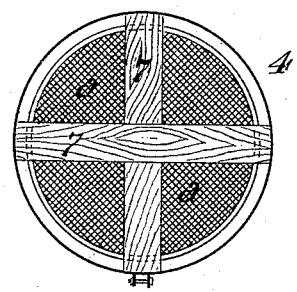
WITNESSES:
R. H. Whittlesey,
F. E. Gaither.
INVENTOR,
Gustav Lindenthal.
by Darwin S. Wolcott
Att'y.

UNITED STATES PATENT OFFICE.

GUSTAV LINDENTHAL, OF PITTSBURG, PENNSYLVANIA.

CABLE FOR SUSPENSION-BRIDGES.

SPECIFICATION forming part of Letters Patent No. 378,696, dated February 28, 1888.

Application filed November 23, 1887. Serial No. 255,976. (No model.)

*To all whom it may concern:*

Be it known that I, GUSTAV LINDENTHAL, a citizen of the United States, residing at Pittsburg, in the county of Allegheny and State of Pennsylvania, have invented or discovered certain new and useful Improvements in Cables for Suspension-Bridges, of which improvements the following is a specification.

The invention herein relates to certain improvements in cables for suspension-bridges, and has for its object the protection of the cable as against unequal heating and consequent expansion of portions thereof, and also the prevention of the access of moisture to the interior of the cable.

In general terms, the invention consists in the construction and arrangement of devices or elements, all as more fully hereinafter described and claimed.

In the accompanying drawings, forming a part of this specification, Figure 1 is a view of the cable in elevation and the protecting-mantle in section. Fig. 2 is a similar view showing a modified form of cable. Fig. 3 is a transverse section on the line $x\ x$, Fig. 1; and Fig. 4 is a similar view on the line $y\ y$, Fig. 2.

In the practice of my invention the wires forming the cable 1 are arranged between the anchorages in the usual or any suitable manner. At suitable intervals along the cable, and preferably at those points where the suspender-rings are to be attached, I secure sleeves 2, provided with flanges 3, said sleeves being made of such a width as to receive the rings for the suspensory rods. The portions of the cable between the sleeves 2 are surrounded by a mantle, 4, of any suitable material, preferably sheet metal, the edges of the mantle at its ends being bent inward or flanged, as at 5, so as to engage the flanges 3 of the sleeves. The longitudinal edges of the mantle are bent out and secured together by bolts or rivets. The mantle should be of sufficient size to afford an air-space between it and the cable, and should preferably be supported at one or more points between the sleeves by collars 6, or other suitables devices. This manner of connecting the ends of the mantle-sections to the sleeves 2 permits of the expansion and contraction of the mantle, and at the same time prevents water from running in upon the cable.

In Fig. 2 I have shown a cable formed of sections $a$, as fully set forth in an application of even date herewith; but in lieu of drawing the sections into close contact with each other, as therein set forth, I arrange spacing pieces or blocks 7 between such sections, thereby separating them and affording air-spaces. In this construction of cable the ends of the spacing pieces or blocks are extended a sufficient distance to serve as an intermediate support for the mantle (see Figs. 2 and 4) in lieu of the collars 6.

As the air has a free circulation between the mantle and cable, and also between the sections $a$ of the cable, an unequal heating of parts of the cable will be prevented to a great extent, if not entirely.

Where it is desired to protect the cable from moisture the supporting-collars 6 may be omitted, the mantle in such case resting upon the cable.

I claim herein as my invention—

1. The combination of a bridge-cable and a sheet-metal mantle forming a continuous cover around the cable, substantially as set forth.

2. The combination of a bridge-cable and a mantle or covering surrounding the same, but separated therefrom for the purpose of forming an air-space, substantially as set forth.

3. The combination of a bridge-cable, sleeves for suspender-rings provided with flanges, and a mantle surrounding the cable and provided with flanges engaging the flanges of the sleeves, substantially as set forth.

4. The combination of a bridge-cable formed in sections and a mantle formed of metal sheets surrounding said cable, substantially as set forth.

5. The combination of a bridge-cable, a flanged sleeve for the suspender-ring, a mantle having flanged ends engaging the sleeve, and a ring or collar for supporting the mantle intermediate between the sleeves, substantially as set forth.

In testimony whereof I have hereunto set my hand.

GUSTAV LINDENTHAL.

Witnesses:
DARWIN S. WOLCOTT,
R. H. WHITTLESEY.